United States Patent [19]
Ray et al.

[11] Patent Number: 5,613,080
[45] Date of Patent: Mar. 18, 1997

[54] MULTIPLE EXECUTION UNIT DISPATCH WITH INSTRUCTION SHIFTING BETWEEN FIRST AND SECOND INSTRUCTION BUFFERS BASED UPON DATA DEPENDENCY

[75] Inventors: David S. Ray, Georgetown; Larry E. Thatcher, Austin, both of Tex.; Henry S. Warren, Jr., Ossining, N.Y.

[73] Assignee: International Business Machines Corporation, Armonk, N.Y.

[21] Appl. No.: 695,750

[22] Filed: Aug. 8, 1996

Related U.S. Application Data

[63] Continuation of Ser. No. 305,507, Sep. 13, 1994, abandoned, which is a continuation of Ser. No. 123,828, Sep. 20, 1993, abandoned.

[51] Int. Cl.$^6$ ............................................. G06F 9/30
[52] U.S. Cl. .................. 395/390; 395/800; 395/391; 364/DIG. 1; 364/DIG. 2
[58] Field of Search ........................ 395/375, 800; 364/232.22, 238.6, 276.8

[56] References Cited

U.S. PATENT DOCUMENTS

| | | |
|---|---|---|
| 3,771,141 | 11/1973 | Culler . |
| 4,095,269 | 6/1978 | Kawabe et al. . |
| 4,130,885 | 12/1978 | Dennis . |
| 4,232,366 | 11/1980 | Levy et al. . |
| 4,376,976 | 3/1983 | Lahti et al. . |
| 4,626,989 | 12/1986 | Torii ........................................ 395/375 |
| 4,630,195 | 12/1986 | Hester et al. . |

(List continued on next page.)

FOREIGN PATENT DOCUMENTS

| | | |
|---|---|---|
| 0101596 | 8/1983 | European Pat. Off. . |
| 0118830 | 2/1984 | European Pat. Off. . |
| 0471191A2 | 7/1991 | European Pat. Off. . |
| 2263565 | 1/1992 | United Kingdom . |

OTHER PUBLICATIONS

*Electronic Design*, May 17 1984, "Data-flow IC Makes Short Work of the Tough Processing Chores", W. Meshach, pp. 191–206.

*IEEE Transactions on Computer*, vol. C–32, No. 5, May 1983, "The Piecewise Data Flow Architecture: Architectural Concepts", J. E. Requa et al, pp. 425–438.

*IEEE Proceedings of the 2nd Annual Sumposium on Computer Architecture*, 1975, "A Preliminary Architecture for a Basic Data-Flow Processor", J. B. Dennis et al, pp. 126–132.

*IEEE Transaction on Computers*, vol. C–26, No. 2, Feb. 1977, "A Data Flow Microprocessor". J. Rumbaugh, pp. 138–146.

*Powerful Central Processors*, "The CDC 6600 Central Processor", pp. 166–199.

A multiple, out-of-order, instruction issuing system for superscalar processors by Dwyer III, 1991.

*Primary Examiner*—William M. Treat
*Assistant Examiner*—Zarni Maung
*Attorney, Agent, or Firm*—Mark E. McBurney

[57] ABSTRACT

A multiple execution unit processing system is provided wherein each execution unit has an associated instruction buffer and all instruction are executed in order. The first execution unit (unit 0) will always contain the oldest instruction and the second unit (unit 1) the newest. Processor instructions, such as load, store, add and the like are provided to each of the instruction buffers (0,1) from an instruction cache buffer. The first instruction (oldest) is placed in buffer 0 and the next (second) instruction is stored in buffer 1. It is determined during the decode stage whether the instructions are dependent on an immediately preceding instruction. If both instructions are independent of other instructions, then they can execute in parallel. However, if the second instruction is dependent on the first, then (subsequent to the first instruction being executed) it is laterally shifted to the first instruction buffer. Instructions are also defined as being dependent on an unavailable resource. In most cases these "unavailable" instructions are allowed to executed in parallel on the execution units.

20 Claims, 5 Drawing Sheets

U.S. PATENT DOCUMENTS

| | | | |
|---|---|---|---|
| 4,675,806 | 6/1987 | Uchida . | |
| 4,766,566 | 8/1988 | Chuang . | |
| 4,807,115 | 2/1989 | Torng . | |
| 4,837,678 | 6/1989 | Culler et al. . | |
| 4,847,755 | 7/1989 | Morrison et al. . | |
| 4,890,218 | 12/1989 | Bram . | |
| 4,928,226 | 5/1990 | Kamada et al. | 395/375 |
| 4,974,155 | 11/1990 | Dulong | 395/375 |
| 5,051,940 | 9/1991 | Vassiliadis et al. | 364/736 |
| 5,075,840 | 12/1991 | Grohoski et al. . | |
| 5,093,908 | 3/1992 | Beacom et al. . | |
| 5,099,421 | 3/1992 | Buerkle et al. . | |
| 5,113,515 | 5/1992 | Fite et al. | 395/425 |
| 5,127,091 | 6/1992 | Boufarah et al. | 395/375 |
| 5,133,077 | 7/1992 | Karne et al. . | |
| 5,185,868 | 2/1993 | Tran | 395/375 |
| 5,197,137 | 3/1993 | Kumar et al. | 395/375 |
| 5,247,628 | 9/1993 | Grohoski | 395/375 |
| 5,251,306 | 10/1993 | Tran | 395/800 |
| 5,257,354 | 10/1993 | Comfort et al. | 395/375 |
| 5,269,007 | 12/1993 | Hanawa et al. | 395/375 |
| 5,283,874 | 2/1994 | Hammond | 395/375 |
| 5,301,341 | 4/1994 | Vassiliadis et al. | 395/800 |
| 5,381,531 | 1/1995 | Hanawa et al. | 395/375 |
| 5,465,377 | 11/1995 | Blaner et al. | 395/800 |
| 5,502,826 | 3/1996 | Vassiliadis et al. | 395/375 |
| 5,504,932 | 4/1996 | Vassiliadis et al. | 395/800 |

A. TIMING EXAMPLE OF INDEPENDENT INSTRUCTIONS

CYCLES

|  | 1 | | 2 | | 3 | | 4 | |
|---|---|---|---|---|---|---|---|---|
|  | 0 | 1 | 0 | 1 | 0 | 1 | 0 | 1 |
| DECODE BUFFER | LOAD | ADD | | | | | | |
| EXECUTE | | | LOAD | ADD | | | | |
| SHIFT | 2 | | 0 | | | | | |
| WRITE BACK | | | | | | ADD | LOAD | |
| CACHE ACCESS | | | | | LOAD | | | |

FIG. 4A

B. TIMING EXAMPLE OF DEPENDENT INSTRUCTIONS

CYCLES

|  | 1 | | 2 | | 3 | | 4 | | 5 | |
|---|---|---|---|---|---|---|---|---|---|---|
|  | 0 | 1 | 0 | 1 | 0 | 1 | 0 | 1 | 0 | 1 |
| DECODE BUFFER | LOAD | ADD | ADD | | | | | | | |
| EXECUTE | | | LOAD | | ADD | | ADD | | | |
| SHIFT | 1 | | 1 | | | | | | | |
| WRITE BACK | | | | | | | LOAD | | ADD | |
| CACHE ACCESS | | | | | LOAD | | | | | |

FIG. 4B

MULTIPLE EXECUTION UNIT DISPATCH WITH INSTRUCTION SHIFTING BETWEEN FIRST AND SECOND INSTRUCTION BUFFERS BASED UPON DATA DEPENDENCY

This is a continuation of application Ser. No. 08/305,507 filed Sep. 13, 1994 now abandoned, which is a continuation of application Ser. No. 08/123,828, filed Sep. 20, 1993, now abandoned.

BACKGROUND OF THE INVENTION

1. Field of the Invention

The present invention relates generally to the dispatch of instructions in a processing system having multiple execution units. More specifically, a system having multiple instruction buffers is provided wherein instructions are defined as dependent, independent or dependent on an unavailable resource. These instructions are executed sequentially or in parallel depending upon their definition and relationship to other instructions.

2. Description of Related Art

It is currently known to have processing systems with multiple execution units therein. A great majority of the conventional systems include multiple special purpose execution units for performing such operations as add, store, load, subtract, multiply, branch, and the like. In order to solve the problems associated with instruction dependencies, conventional systems place the specific instructions in a buffer associated with the corresponding special purpose execution unit. For example, a load operation will be placed in a buffer associated with the load unit, and so on. If instruction dependencies are present conventional systems merely hold the later instruction, which depends on the outcome of a previous instruction. Once the previous instruction has executed the later dependent instruction is allowed to execute on the specific execution unit. It should be noted that in conventional systems shifting of instructions may occur between various buffers associated with various execution units, but this shifting depends on the relationship between the type of instruction and the particular execution unit which can execute that type of instruction. That is, a load instruction may be shifted to a buffer associated with the load execution unit. Also, these prior art, multiple execution unit systems generally execute instruction in an out of order sequence, in contrast to the present invention which preserves the order of the instructions.

U.S. Pat. No. 5,133,077 shows multiple distinct execution, each having responsibility for specific types of instructions. Therefore, each instruction must be stored in a specific buffer that is associated with one of the execution units, based on the type of instruction. These instructions cannot be shifted to another buffer associated with another execution unit, because they are specific to a certain type of execution unit. Thus, when instruction dependencies are discovered this system has no alternative, but to hold the later dependent instruction until the previous instruction, which the held instruction is dependent upon, has completed execution.

U.S. Pat. No. 4,837,678 discusses a system including an instruction sequencer including a shifting circuit that receives instructions and shifts them based on the type of instruction and which execution unit is required to execute the instruction (column 11, lines 8–30), not dependencies between instructions.

U.S. Pat. No. 4,847,755 is a processing system having a plurality of processor elements which analyzes instructions stream and adds intelligence to the instruction stream. For example, the system looks for natural concurrencies (independent instructions) and adds intelligence including a logical processor number and an instruction firing time to each instruction (column 17, lines 54–60), which essentially reorders the instructions. Logical resource drivers then (column 18, lines 10–25) deliver each instruction to the selected processing element.

U.S. Pat. No. 5,075,840 discusses a system with multiple processors which can execute instructions out of order. This system includes the capability to delay execution of a specific type of instruction until it can be executed in its appropriate sequential order.

It can be seen that none of the conventional systems provide a general solution to the problems associated with executing dependent instructions in a system having multiple execution units while preserving the sequence of all instructions. Many conventional systems, by executing instructions out of order, require a sophisticated branching mechanism which adds a great deal of complexity to the processing system. Thus, by preserving the order of the instructions the present invention optimizes performance by reducing overhead, e.g. determining when a branch will occur. It would be advantageous to have a processor that can operate with many types of computer systems wherein instructions are analyzed and executed based only on their dependencies with other instructions and not the capabilities of the execution units.

SUMMARY OF THE INVENTION

In contrast to the prior art, the present invention provides a system wherein instructions are analyzed during the decode stage and it is then determined whether these instructions are considered independent, dependent or "unavailable". For the purposes of the present invention dependent instructions are defined as only those instructions which are dependent on the immediately preceding instruction. Instructions which depend on the availability of a value in a resource, e.g. a register, are defined as "unavailable" and, in some cases, may be treated by the present invention as independent and shifted in parallel (but not out of order). Of course, totally independent instruction are executed in parallel.

Broadly, a dual execution unit processing system is provided wherein each execution unit has an associated instruction buffer. The first execution unit (unit 0) will always contain the oldest instruction and the second unit (unit 1) the newest. Processor instructions, such as load, store, add and the like are provided to each of the instruction buffers (0,1) from an instruction cache buffer. The first instruction (oldest) is placed in buffer 0 and the next (second) instruction is stored in buffer 1. It is determined during the decode stage whether the instructions are dependent, and must be executed one at a time, or if the instructions are independent or "unavailable" and can execute in parallel. If the second instruction is dependent on the first, then (subsequent to the first instruction being executed) the second is laterally shifted from buffer 1 to the first instruction buffer 0. This shift is due entirely to the dependency of the second instruction on the first instruction. The shifted instruction then becomes the first instruction and a new "second" instruction is received in the second instruction buffer. It should be noted that all instructions will execute in sequential order. If a large number of sequential dependent instructions are encountered, then they will be executed in order by execution unit 0 only. That is, the first two instructions will be determined to be dependent and placed in both instruction buffers. Since, the instruction in the second buffer is dependent on the first, then subsequent to execution of the first instruction, it will shift to the first instruction buffer. The next instruction will then be placed in the second instruction buffer 1 and if it is also dependent it will then be shifted to the first buffer after the previous instruction has been executed, and so on. If the next instructions are independent, then both will execute in parallel on the first and second execution units. In this manner, processor instructions are efficiently executed, in order based on their dependencies with other instructions, not the capabilities of the execution units.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 4 is a timing diagram showing examples of the number of machine cycles required by the present invention to execute independent and dependent instructions.

DETAILED DESCRIPTION OF THE PREFERRED EMBODIMENTS

Figure 1:
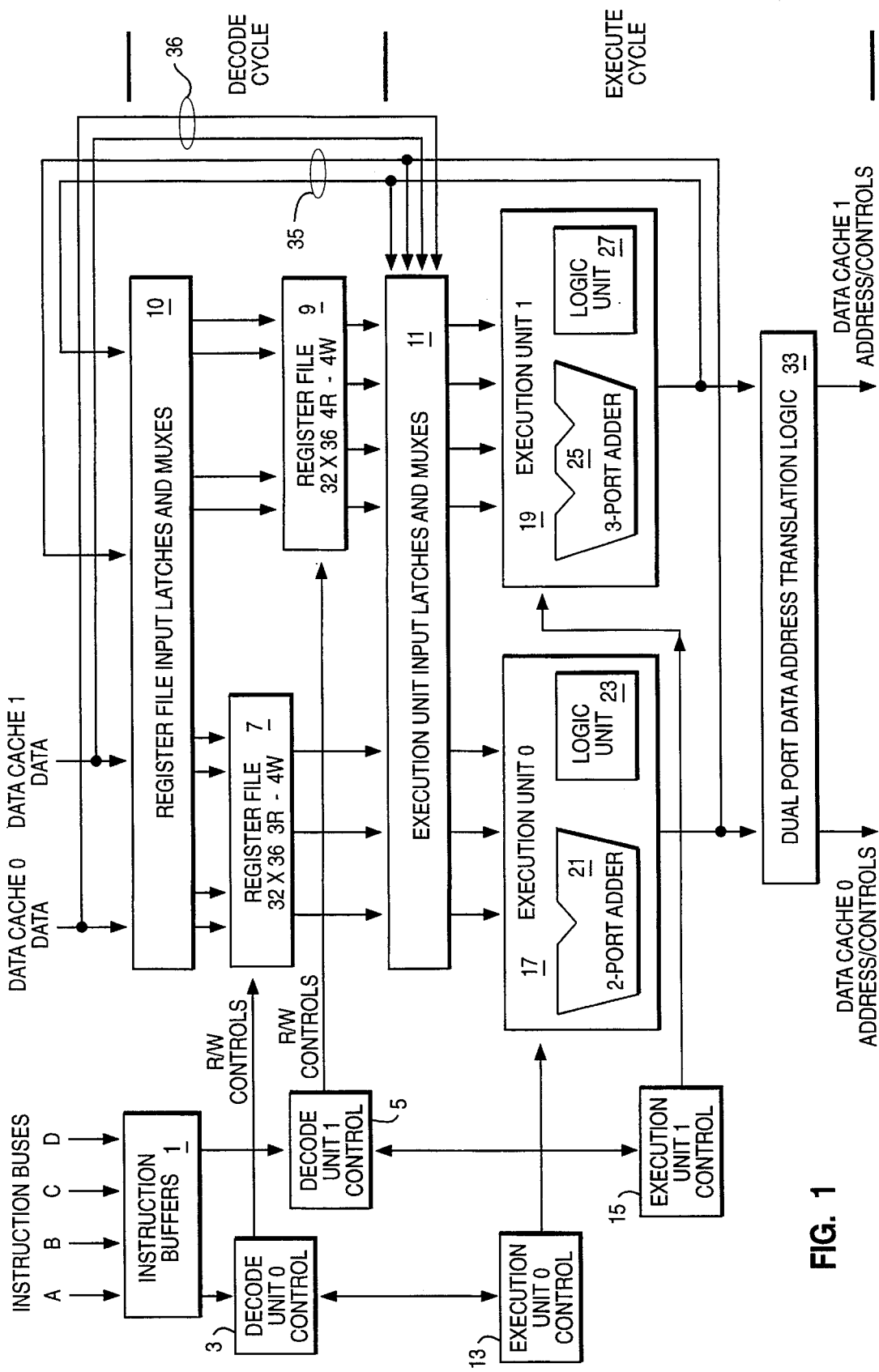
FIG. 1 is a block diagram showing various components of a multiple execution processor capable of utilizing the present invention.

Referring to FIG. 1, a high level block diagram is shown of the various components in a multiple execution processor of the present invention. Reference numeral 1 denotes an instruction buffer which receives instructions from instruction buses A, B, C, D. The instruction buffer 1 is a storage device, such as hardware memory, as is known in the art. The register file input latches 10 receive data from a dual port data cache unit (not shown) which is connected to system memory (not shown). It should be noted that a preferred embodiment of the present invention is a processor having two execution units, although processing systems having greater than two execution units are contemplated. Decode control units 3 and 5 (corresponding to execution units 0 and 1, respectively) are used to interpret instructions received from instruction buffer 1. The decode units 3, 5 are able to recognize the instructions as load, store, add, or the like. Each decode unit 3, 5 has a corresponding register file 7, 9, respectively, which receives data from the input latches 10, either directly from the data cache bus 36, or through write back data line 35. Decode units 3 and 5 provide the read/write control signals to the register files 7 and 9, based on the instructions received from buffer 1. These control signals determine which data will be written from the input latches 10 to register files 7, 9, and read from register files 7, 9 to execution input latches 11. It can be seen from FIG. 1 that register file 7 allows four data words to be written from the input register and three data words to be read therefrom by execution latches 11. Register file 9 allows four data words to written from input register file 10 and four words read therefrom by execution unit latches 11.

It should be noted that the present invention is implemented in boolean logic which is contained within decode control units 3 and 5. This logic implements the process of interpreting the instructions and determines whether one or two instructions may be shifted into execution units 17 and 19. The logic flow of the present invention, illustrated in the flow charts of FIGS. 3a and 3b, may be readily transformed into the hardware logic implemented by the decode units 3 and 5 of the present invention by one of average skill in the art.

Those skilled in the art will also understand that the present invention is a processor with pipelined architecture. This means that data is latched, or held, at various stages. In this way, the results of executed instructions, or the like, are saved such that different instructions can be concurrently input to the processing system. Thus, a continuous flow of data through the processor is possible. Execution unit input latches hold data provided by register files 7 and 9 prior to the data being input to the actual execution units. Multiplexers (not shown) are also included in execution unit input latches 11, which can combine the data signals received from the data cache bus 36 such that the data can be bypass to the execution units. It should be noted that register file input latches 10 also includes multiplexers in order to allow the combination of data from the data cache unit bus 36 and write back bus 35.

Execution units 17 and 19 are both full function units capable of executing a plurality of instructions. These units may be identical, however, this limitation is not required by the present invention. In a preferred embodiment, units 17 and 19 are not identical, but are two full function execution units, one having slightly different features to handle the specific requirements of a few specialized instructions. Execution unit 17 includes a dual port adder 21 that performs add functions, and a logic unit 23 which is used to execute instructions such as rotate, or the like. A three port adder 25 is included in execution unit 19, along with logic unit 27. The three port adder 25 provides a major saving in the number of cycles required to execute an add type instruction which includes load, store, compare and the like. This is due to the ability of the invention to treat all add type instructions as independent instructions, when determining which instructions can be executed in parallel. In prior art systems add type instructions are considered dependent, i.e., the second instruction must wait until completion of the previous instruction. For example, the instructions (1) ADD R1, R2, R3 and (2) ADD R5, R1, R4 are typically used to add the values in registers files R2 and R3 and to put the new value in register file R1. The next instruction must wait until the value is placed in register file R1 because this value is added to a value register file R4 to obtain the desired resulting value which is then placed in register file R5. In can be seen that the desired result is actually the sum of the values in register files R2, R3 and R4. Thus, to perform this operation conventional systems require execution of two instructions over two machine cycles.

In contrast, the present invention is capable of performing the same operation in a single machine cycle by providing a mechanism that allows ADD instructions to be defined as independent, and therefore, execute in parallel. Using the previous example, when instructions ADD R1, R2, R3 and ADD R5, R1, R4 are decoded by decode control units 3 and 5, they are interpreted to mean Add R1, R2, R3 and Add R5, R2, R3, R4, i.e. the dependent instructions are collapsed into independent instructions wherein the values in R2 and R3 are substituted for the value in R1 in the second instruction. The first add instruction, ADD R1, R2, R3, must still be executed, because the value placed in register file R1 may be required by instructions other than the following add instruction (ADD R5, R1, R4). Further, due to the existence of three port adder 25, both of these instructions can be executed simultaneously. That is, ADD R1, R2, R3 is executed on two port adder 21 and ADD R5, R2, R3, R4 is concurrently executed on three port adder 25. In this manner, the present invention is capable of defining add type instructions as being independent of any other instruction.

Execution control units 13 and 15 are also provided which receive decoded instructions from decode units 3, 5 and input the instructions, in the form of control signals to execution units 17 and 19, respectively. During execution of load and store instructions by units 17 and 19, an effective address is calculated by adders 21 and 25 for the data being manipulated (i.e. where in the cache the referenced data is located), as well as calculating the data values themselves for store instructions. The effective address is then transferred to the dual port data address translation logic unit 33, which translates the previously calculated effective address from the execution units to a physical address (i.e. where in the memory the referenced data is located). Data is returned from the data cache on bus 36 and is input to register file input latches 10 and may be bypassed to execution input latches 11 (via data cache bus 36). For other types of instructions which manipulate data in the processor, such as add instructions, the data values from execution units 17, 19 are input to register file input latches 10 and may be bypassed to the execution input latches 11 (via write back bus 35).

Figure 2:
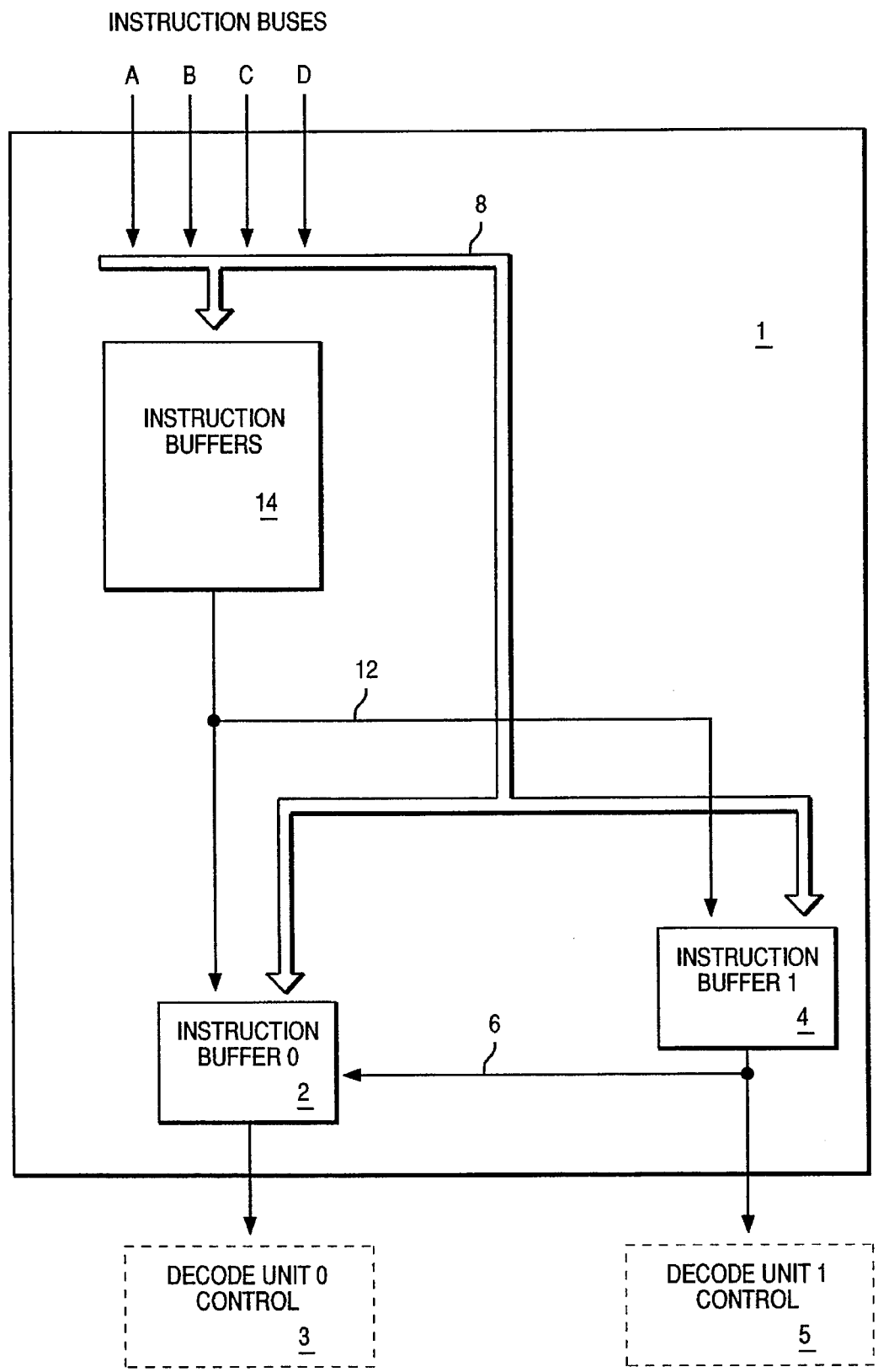
FIG. 2 is a more detailed diagram of the present invention illustrating the instruction buffers which are associated with each execution unit and the instruction flow paths.

FIG. 2 is a more detailed view of instruction buffer 1, shown in FIG. 1. Instruction buses A, B, C and D input instructions from an instruction cache unit, or the like, to a bus 8, which transmits the instructions directly to the actual instruction buffers 14, which are first-in, first-out hardware storage devices. Output instruction buffers 2 and 4 receive the instructions, either directly from bus 8, or from buffer 14, via bus 12. Instruction buffers 2 and 4 each correspond to one of the execution units 17, 19, respectively. Further, a bus 6 is provided that allows instructions to be shifted, or transferred between output buffers 2 and 4. Since, the preferred embodiment of the present invention includes two full function processing units, instructions can be shifted between output buffers 2 and 4 for execution by either unit 17, 19. The significance of this capability will be more fully described below in conjunction with FIGS. 3a and 3b. The instructions to be executed are then output from buffers 2 and 4 to decode control units 3 and 5.

Figure 3A:
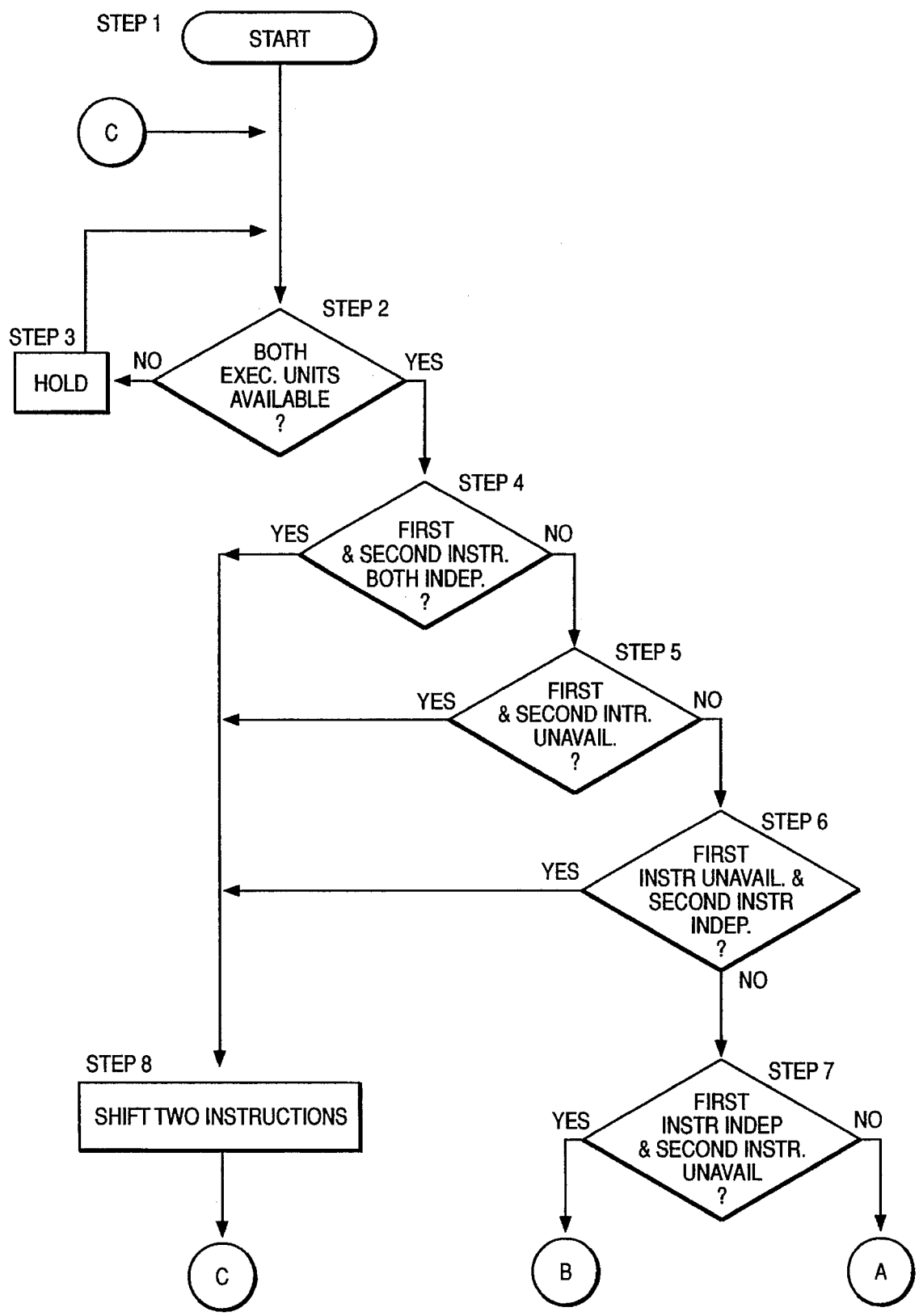
FIGS. 3a and 3b are flowcharts illustrating a preferred embodiment of the present invention wherein the first and second instructions are shown as being dependent, based on various criteria.
Figure 3B:
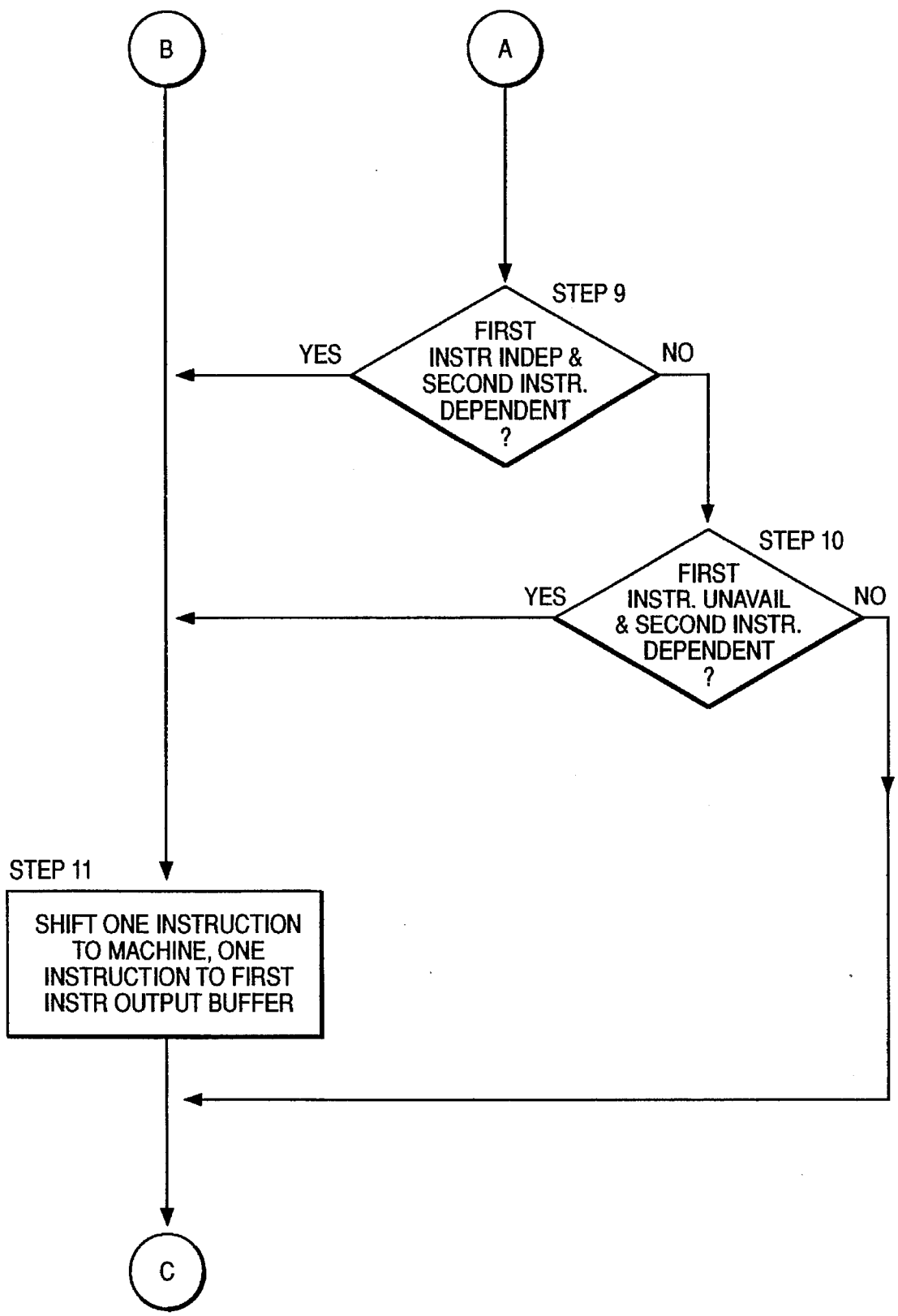

FIGS. 3a and 3b show the relationship between the instructions defined by the present invention. One category is defined as instructions which are dependent on previous instructions, other than the immediately prior instruction. That is, a value loaded from memory by a LOAD instruction may be utilized by subsequent instructions that are executed several machine cycles later. For example, assume the following instructions are encountered:
(1) LOAD R1, R31, R30
(2) ADD R4, R3, R2
(3) ADD R5, R1, R2

The first instruction (1) loads a value in register file R1. An effective address in memory is computed by adding R31 and R30. The data at the "computed" address is loaded into R1. Next, instruction (2) adds the contents of register files R3 and R2 and places the resulting value in register file R4. Instruction (3) then uses the value previously loaded in register file R1 and adds this value to the value in register file R2 and puts the result in register file R5. It can be seen that instruction (3) is dependent on a value in a resource (register file R1) that may be unavailable, i.e. the value to be loaded in register file R1 may have to come from system memory which may take many machine cycles.

The present invention defines those instructions which are dependent on a previous instruction, other than the immediately preceding instruction, as "unavailable" for being dependent on a potentially unavailable resource (register file). These "unavailable" instructions are allowed to move in parallel into execution units 17 and 19 as if they were independent. However, as will be discussed in greater detail below there are other conditions, such as when an "unavailable" instruction precedes a dependent instruction, when these instructions must execute sequentially. These "unavailable" instructions, along with dependent instructions are considered to be data dependent instructions, i.e. instructions that have some type of data dependency, whether it is based on the immediately preceding instruction, or another previous instruction.

Therefore, in accordance with the present invention, all instructions are classified as either: (1) independent; (2) dependent; or (3) unavailable. The present invention provides a mechanism which determines what combinations of these instructions can execute simultaneously on execution units 17 and 19, and which of the instructions must execute sequentially. Instructions are provided to instruction units buffers 2 and 4 in pairs with the first instruction being provided to instruction buffer 0 (reference numeral 2) and the second instruction to buffer 1 (reference number 4). In this manner all instructions are either executed one at a time in sequential order, or executed in parallel in which the original order is also maintained. The sequential order is preserved because the oldest instruction is always placed in instruction buffer 2 and considered to be executed prior to the instruction in buffer 4. As previously noted, dependent instructions are defined as only those instructions which are dependent on the immediately previous instruction, the exception of add instructions using the three port adder, which are considered independent for the purposes of the present invention. Independent instructions are defined as those which do not require any results, values, data, resources, or the like from, or utilized by any previous instruction. "Unavailable" instructions are those defined above as being dependent on an instruction other than the immediately preceding instruction.

As noted above, FIGS. 3a and 3b are flow charts describing the execution of the previously defined instructions in accordance with the present invention to most efficiently utilize the dual execution units 17 and 19. First, a general description of the process will be presented, followed by a specific example, using common instructions, defined as set forth above. Further, the following description will cover the case where two execution units are present, however, it should be understood that processing systems having different numbers of execution units are contemplated by the present invention.

At step 1, the process is started and step 2 determines if both execution units 17 and 19 are available. If not, then the system is held at step 3 until both units are available for use. Once the units are available, then step 4 determines if the first and second instructions in the instruction stream (from instruction buffers 2 and 4 of FIG. 2) are both independent or both dependent instructions. If both the first and second instructions are independent, then both instructions are shifted into the machine, to be decoded by units 3 and 5, and simultaneously execute on execution units 17 and 19 (step 8). If, the first and second instructions are not both independent instructions, then the method proceeds to step 5, wherein it is determined if the first and second instructions are both to be held off for some reason. This occurs when the contents of a register are needed, but not yet available. This type of instruction is not dependent on the outcome of the immediately previous instruction, but some instruction or resource defined as "unavailable". If both the first and second instructions are unavailable, then both instructions are shifted at step 8, since, regardless of the location of the instruction (in instruction buffer or decode), the system will have to wait for the "unavailable" resources needed by these instructions to become accessible. Therefore, "unavailable" instructions can be shifted to the execution units 17 and 19 allowing new instructions to be moved into buffer 2 and 4.

If the first instruction is dependent on an unavailable register file entry and the second is independent (step 6) then both of these instructions are shifted to the execution units at step 8. In this situation, the present invention allows two instructions to be shifted, because the "unavailable" instruction is moved into the execution unit 17 to wait for access of the required data, and the independent instruction can wait in execution unit 14 until the "unavailable" instruction is ready and then both instruction will executed in parallel. However, if the first instruction is not "unavailable", or the second instruction is not independent, then the instruction execution method of the present invention proceeds to step 7 which determines if the first instruction is independent and the second instruction is "unavailable". In the situation of step 7, only a single instruction is shifted because it is necessary to move the unavailable instruction over to instruction buffer 2, because if the instruction following the unavailable instruction is either independent, or unavailable, then two instructions can be shifted during the next machine cycle. Also, because the present invention executes all instructions in order, it is advantageous to have instruction buffer 4 ready to receive the next instruction. That is, if the system has to wait until the unavailable instruction executes, it is most efficient to have the instruction waiting in buffer 2 where it will be the next instruction to execute. In this way, a subsequent instruction can be moved into instruction buffer 4, thereby avoiding a bubble in the pipeline. A cycle would be wasted if the machine had to laterally shift the unavailable instruction over to buffer 2, after the resource became available. Thus, a continuous flow of instructions is ensured since the next subsequent instruction can be placed in buffer 4 after the shift of the unavailable instruction from buffer 4 to buffer 2.

If the conditions of step 7 are met, then the method continues to step 11 where a single instruction is shifted to the machine for decoding and execution. It should be noted that shifting one instruction is defined herein to mean shifting the instruction in instruction buffer to execution unit 17 and shifting the instruction in instruction buffer 4 to instruction buffer 2. Shifting two instructions means simultaneously shifting two instructions from buffers 2 and 4 into execution units 17 and 19. However, if the first instruction is not independent and the second instruction is not "unavailable" then step 9 determines if the first instruction is independent and the second instruction is dependent. If so, the process continues to step 11 where the independent instruction is shifted to the machine (from buffer 2 to execution unit 17) and executed, and the dependent instruction is shifted from instruction buffer 4 to instruction buffer 2. It should be noted that the dependent instruction is now dependent on an instruction that has already executed and no longer considered to be dependent. Subsequent to step 11, the process will loop back to step 2 and another instruction (second) will be provided by bus 8, or buffer 14 and these two instructions will be considered according to the criteria of steps 2, 4–7,9 and 10.

If, at step 9, it was determined that the first instruction is not independent and the second is not dependent, then step 10 determines if the first instruction is unavailable and the second instruction is dependent. If so, the method proceeds to step 11 wherein the first instruction is provided to the machine and the second is shifted to the first instruction output buffer (shift 1). It can be seen how the determination blocks (steps 4–10) of the present invention address each type of defined instruction to ensure that the maximum number of instructions will be executed in parallel, while also being executed sequentially.

Next, a typical instruction sequence will be used as an example of the operation of the present invention. Assume, that the following instruction are received in buffer 1 from buses A, B, C, D:
(1) LOAD R1, R31, R30
(2) LOAD R2, R29, R30
(3) ADD R22, R20, R21
(4) ADD R24, R22, R23
(5) ADD R3, R1, R2
(6) LOAD R6, R2, R22
(7) LOAD R25, R28, R29
(8) ADD R8, R6, R7
(9) LOAD R9, R27, R28
(10) LOAD R10, R31, R30
(11) ADD R11, R9, R3
(12) OR R11, R11 R20
(13) ADD R13, R11, R12

The first two instructions (1) and (2) are placed in buffers 2 and 4. These instructions load values in register files R1 and R2, based on addresses calculated from values in register files R31, R30 and R29, R30, respectively. Instructions (1) and (2) are independent, since they do not depend on any other instructions, and both are shifted to execution units 17 and 19, simultaneously (shift 2), in accordance with step 4 of FIG. 3a. Instructions (3) and (4) are then placed in buffers 2 and 4, respectively. Instruction (3) is an add instruction which sums the values of two register files R20, R21 and places the result in register file R22. Instruction (4) is another add operation which uses the result of the preceding add instruction (3), i.e. the value in R22 is added to the value in R23 and the result placed in register file R24. Instructions (3) and (4) have added the values in register files R20, R21 and R23. Due to the presence of three port adder 25 in the present invention, these instructions are considered to be independent and are shifted by the present invention to execution units 17 and 19 for concurrent execution (step 4, FIG. 3a).

Instructions (5) and (6) are then moved into buffers 2 and 4, respectively. Instruction (5) is an add instruction which is dependent on instructions (1) and (2) neither of which is the previous instruction, therefore instruction (5) is considered "unavailable". Instruction (6) is a load instruction whose effective address is dependent on values in register files R2 and R22. These values are not affected by previous instruction (5). However, R2 is dependent on instruction (load R2) and therefore, instruction (6) is also defined as "unavailable" In accordance with the present invention (step 5 of FIG. 3a), two "unavailable" instructions are shifted to execution units 17 and 19, where they will wait for access to the unavailable data. This allows the next two instructions to be moved into buffers 2 and 4.

Instruction (7) is a load instruction which loads a value from memory to a register file R25 in the processor. Instruction (7) is independent from any other instructions or registers. Instruction (8) is an add instruction that adds values in register files R6, R7 and puts the sum in R8. This instruction (8) is "unavailable", since it depends on instruction (6). In this case, where the first instruction is independent and the second is unavailable, only instruction (7) in buffer 2 is shifted (to execution unit 17) while instruction (8) is laterally moved from buffer 4 to buffer 2 (step 7, FIG. 3a). The next instruction (9) is then placed in buffer 4 and instructions (8) and (9) are considered. Instruction (9) is a load instruction that puts a value in from memory into register file R9 in the processor, and is considered to be independent. Therefore, an unavailable instruction (8) is in buffer 2 and an independent instruction (9) is in buffer 4. In this case both instructions (8) and (9) will be shifted to the execution units 17 and 19, simultaneously, as soon as the previous instructions have executed (step 6, FIG. 3a).

The next two instructions (10) and (11) are then provided to buffers 2 and 4, respectively. Instruction (10) is an independent instruction wherein the contents of a location in memory are loaded into register file R10 in the processing system. Instruction (11) is "unavailable" since it depends on a value in register file R9 which was determined during a previous instruction (other than the immediately preceding instruction). In the case where the first instruction (10) in independent and the second instruction is unavailable (11), the first instruction (10) will be shifted to execution unit 17 from buffer 2, and the second instruction (11) will be shifted from buffer 4 to buffer 2 (step 7, FIG. 3a).

Instruction (12), is an OR instruction which performs a logical "or" operation on the contents of two register files, in this case R11 and R20 and places the result in register file R11. It can be seen that instruction (12) is dependent on the previous instruction (11), which determines the value in register file R11. Thus, there is an unavailable instruction (11) in buffer 2 and a dependent instruction (12) in buffer 4. In this case, a single instruction (11) is shifted to execution unit 17 (step 10, FIG. 3b). Instruction (12) cannot be shifted to execution 19, because it needs the value in R11. Instruction (12) is then shifted to buffer 2 to be executed subsequent to instruction (11). Instruction (13), which adds the contents of register files R11 and R12 and places the sum in register file R13 is then moved to buffer 4. Instruction (12) is now considered to be independent since the instruction (11) on which it depends has executed. Instruction (13) is dependent since it is dependent on the immediately preceding instruction (12). Thus, there is an independent instruction (12) in buffer 2 and a dependent instruction (13) in buffer 4. In this instance, independent instruction (12) is moved to execution unit 17 and dependent instruction (13) is shifted laterally to buffer 2 (step 9, FIG. 3b).

FIG. 4 shows two timing diagrams A and B that provide a comparison in the number of machine cycles that are required to execute a load and add instruction when the instructions are independent (diagram A) and when the instructions are dependent (diagram B).

With regard to diagram A, at cycle 1, the load and add instructions are stored in instruction buffers 2 and 4, respectively and since both instructions are independent (step 4, FIG. 3a), then they are both shifted to execution units 13 and 15 for execution during cycle 2. At the end of cycle 2, the data from the add instruction is latched into register file input latches 10. The data for the load instruction is then accessed from the cache, during cycle 3 and latched into register file input latch 10. Also during cycle 3, the control signal for the add instruction causes a write back to the register files 7, 9. At cycle 4, the data from the cache that was in input register 10 is written to register 11 in register files 7, 9.

Diagram B shows the same instructions in the instruction buffers (also in the 0 and 1) positions at cycle 1, however, in this case the add instruction is dependent on the load instruction, e.g. LOAD R1 and ADD R1, R2, R3. In this case only the load instruction is shifted to the execution control unit, during cycle 2 (in accordance with step 9 of FIG. 3b). Also during cycle 2, the add instruction is shifted from instruction buffer 4 to buffer 2, effectively shifting this instruction for execution by processor 17, rather than 19. It should be noted, that in this case the load and add instructions will be executed in sequence on processor 17. Of course, additional instructions from bus 8, or buffer 14, will be provided to instruction buffer 4 during cycles 2–5 and analyzed in accordance with the process of FIGS. 3a and 3b. However, for the sake of simplicity, these additional instructions have not been shown in diagrams A and B. During cycle 3, the load instruction causes the cache to be accessed and the requested data loaded into input register 10 and bypassed into execution unit input latch 11. Also, the add instruction is moved to execution control 13, where it stalls because data is unavailable. The add instruction is then executed during cycle 4, and the register files 7, 9 are written with the load data. Finally, the add instruction results are written back to the register files 7, 9 during cycle 5.

It can be seen that the same independent instructions can be executed in fewer cycles than identical dependent instruction. Diagrams A and B clearly show how independent instructions can be executed in parallel, on different execution units, while the dependent instruction must be executed serially. The add instruction of Diagram A executed prior to the load instruction, because of its independence. However, in Diagram B the add executes after the load instruction since it is dependent thereon.

Those skilled in the art will understand that the present invention increases processor performance by executing more instructions per cycle than conventional systems. For example, if instructions defined as independent, unavailable, independent (I1, U, I2) are provided to a conventional dual execution unit system, I1 and U are provided to units 0 and 1. The processing system executes I1 and then (n cycles later) executes the U instruction when the resource becomes available. Thus, in a conventional system 2 instructions are executed in n cycles. However, the present invention, after I1 executes, moves the U instruction to execution unit 0 and shifts I2 to execution unit 1. The processing system then executes both U and I2 (after the n cycles) when the resource becomes available. Of course, I2 can execute in parallel with U since it is independent. Thus, the present invention allows 3 instructions to be executed in n cycles. Other advantages are also present when an unavailable instruction U2 follows U in the previous example. In this case, there is a high probability that both U and U2 would be allowed to execute in parallel, since sequential unavailable instructions are often dependent on the same resource and once it is available (after n cycles), then both can execute. Therefore, the present invention again executes 3 instructions in n cycles, whereas conventional systems would only execute 2 since U2 would wait on U to execute.

Although certain preferred embodiments have been shown and described, it will be understood by those skilled in the art that many changes and modifications may be made therein without departing from the scope of the appended claims.

We claim:

1. A computer processing system including a first and second execution unit, comprising:

first and second instruction buffers, which receive instructions in a particular sequence from an instruction cache, corresponding to respective said first and second execution units for providing said instructions thereto;

means for interpreting whether said instructions in said first and second instruction buffers are independent instructions;

means for concurrently providing said instructions in said first instruction buffer and said instructions in said second instruction buffer to said first and second execution units, respectively, when said instructions in said first and second instruction buffers are determined to be independent; and means for providing one of said instructions in said first instruction buffer to said first execution unit and concurrently moving one of said instructions directly from said second instruction buffer to said first instruction buffer and another of said instructions from said instruction cache to said second instruction buffer when said instruction in said second instruction buffer is dependent on the instruction in said first instruction buffer;

wherein said particular sequence of said instructions is maintained and executed in order.

2. A system according to claim 1 wherein said data dependent instructions comprise dependent and unavailable instructions, and said other non-data dependent instructions comprise independent instructions.

3. A system according to claim 2 further comprising a three port adder used to concurrently add three values stored in three distinct storage locations and cause said means for interpreting to designate said instructions for adding said three values as independent instructions which can be executed independent of any other said instructions.

4. A system according to claim 3 wherein a decode logic circuit is included in said means for interpreting and causes said independent instructions to be shifted in parallel from said first and second instruction buffers to said respective first and second execution units.

5. A system according to claim 4 wherein said decode control circuit causes said unavailable instructions to be shifted in parallel from said first and second instruction buffers to said respective first and second execution units.

6. A system according to claim 5 wherein said decode control circuit causes one of said dependent instructions in said first instruction buffer to be shifted to said first execution unit and one of said dependent instructions in said second instruction buffer to be moved to said first instruction buffer.

7. A system according to claim 6 wherein said decode control circuit causes one of said unavailable instructions in said first instruction buffer and one of said independent instructions in said second instruction buffer to be shifted in parallel to said respective first and second execution units.

8. A system according to claim 7 wherein said decode control circuit causes one of said independent instructions in said first instruction buffer to be shifted to said first execution unit and one of said unavailable instructions in said second instruction buffer to be moved to said first instruction buffer.

9. A system according to claim 8 wherein said decode control circuit causes one of said independent instructions in said first instruction buffer to be shifted to said first execution unit and one of said dependent instructions in said second instruction buffer to be moved to said first instruction buffer.

10. A system according to claim 9 further comprising:

means for causing a single successive instruction to be input to said second instruction buffer subsequent to said instruction currently in said second instruction buffer being moved, by said decode control circuit, to said first instruction buffer; and means for causing first and second successive instructions to be input to said first and second instruction buffers, respectively, when said instructions currently in both said first and second instruction buffers are shifted in parallel by said decode control circuit to said first and second execution units, respectively.

11. A method of executing instructions on a computer processing system including a first and second execution unit, comprising the steps of:

providing first and second instruction buffers, which receive instructions in a particular sequence from an instruction cache, corresponding to said first and second execution units for providing instructions thereto;

interpreting, by a decode control circuit, whether said instructions in said first and second instruction buffers are independent instructions;

concurrently providing, by said decode control circuit, said instructions in said first instruction buffer and said instructions in said second instruction buffer to said first and second execution units, respectively, when said instructions in said first and second instruction buffers are determined to be independent; and providing one of said instructions in said first instruction buffer to said first execution unit and concurrently moving, by said decode control circuit, one of said instructions directly from said second instruction buffer to said first instruction buffer and another of said instructions from said instruction cache to said second instruction buffer when said instruction in said second instruction buffer is dependent on the instruction in said first instruction buffer;

wherein said particular sequence of said instructions is maintained and executed in order.

12. A method according to claim 11 wherein said step of moving comprises the step of transferring said instructions from said second buffer to said first buffer via a bus interconnecting said first and second buffers.

13. A method according to claim 12 wherein said data dependent instructions comprise dependent and unavailable instructions, and said other instructions comprise independent instructions.

14. A method according to claim 13 further comprising the step of using a three port adder to concurrently add three values stored in three distinct storage locations and cause said second circuit to designate said instructions for adding said three values as independent instructions which can be executed independent of any other said instructions.

15. A method according to claim 14 further comprising the steps of:

shifting, by said decode circuit, said independent instructions in parallel from said first and second instruction buffers to said respective first and second execution units; and shifting, by said decode circuit, said unavailable instructions in parallel from said first and second instruction buffers to said respective first and second execution units.

16. A method according to claim 15 further comprising the steps of:
- shifting, by said decode circuit, one of said dependent instructions in said first instruction buffer to said first execution unit; and
- moving, by said decode circuit, one of said dependent instructions in said second instruction buffer to said first instruction buffer.

17. A method according to claim 16 further comprising the step of shifting, by said decode circuit, one of said unavailable instructions in said first instruction buffer and one of said independent instructions in said second instruction buffer to said respective first and second execution units.

18. A method according to claim 17 further comprising the steps of:
- shifting, by said decode circuit, one of said independent instructions in said first instruction buffer to said first execution unit; and
- moving, by said decode circuit, one of said unavailable instructions in said second instruction buffer to said first instruction buffer.

19. A method according to claim 18 further comprising the steps of:
- shifting, by said decode circuit, one of said independent instructions in said first instruction buffer to said first execution unit; and
- moving, by said decode circuit, one of said dependent instructions in said second instruction buffer to said first instruction buffer.

20. A method according to claim 19 further comprising the steps of:
- causing a single successive instruction to be input to said second instruction buffer subsequent to said instruction currently in said second instruction buffer being moved, by said decode circuit, to said first instruction buffer; and
- causing first and second successive instructions to be input to said first and second instruction buffers, respectively, when said instructions currently in both said first and second instruction buffers are shifted in parallel by said decode circuit to said first and second execution units, respectively.

* * * * *